United States Patent
Gulati et al.

(10) Patent No.: US 9,292,353 B2
(45) Date of Patent: Mar. 22, 2016

(54) RESOURCE ALLOCATION USING CAPACITY DISTRIBUTION

(71) Applicant: VMware, Inc., Palo Alto, CA (US)

(72) Inventors: Ajay Gulati, Palo Alto, CA (US); Ganesha Shanmuganathan, Mountain View, CA (US); Peter Joseph Varman, Houston, TX (US)

(73) Assignee: VMware, Inc., Palo Alto, CA (US)

( * ) Notice: Subject to any disclaimer, the term of this patent is extended or adjusted under 35 U.S.C. 154(b) by 288 days.

(21) Appl. No.: 13/779,014

(22) Filed: Feb. 27, 2013

(65) Prior Publication Data

US 2014/0244841 A1    Aug. 28, 2014

(51) Int. Cl.
G06F 15/16    (2006.01)
G06F 9/50    (2006.01)

(52) U.S. Cl.
CPC .......... *G06F 9/5072* (2013.01); *G06F 2209/504* (2013.01); *Y02B 60/142* (2013.01)

(58) Field of Classification Search
None
See application file for complete search history.

(56) References Cited

U.S. PATENT DOCUMENTS

| 2004/0017825 | A1* | 1/2004 | Stanwood et al. | 370/468 |
| 2007/0094323 | A1* | 4/2007 | Smith | 709/202 |
| 2008/0126547 | A1* | 5/2008 | Waldspurger | 709/226 |
| 2010/0100877 | A1* | 4/2010 | Greene et al. | 718/1 |

OTHER PUBLICATIONS

Resource Management with VMware DRS, 2006; http://vmware.com/pdf/vmware_drs_wp.pdf.
A. Gulati et al.; "PARDA: Proportionate Allocation of Resources for Distributed Storage Access", In Proc. Conference File and Storage Technology; (FAST'09); Feb. 2009, pp. 85-98.
VMware, Inc.; VSphere Resource Management Guide: ESX 4.1, ESXi4.1, vCenter Server 4.1; 2010.

* cited by examiner

*Primary Examiner* — Scott B Christensen

(57) ABSTRACT

A system and method for allocating a resource among clients running on host computers using capacity distribution uses lower and upper bounds with respect to a capacity to be distributed to each of the clients. Each client is allocated a portion of the capacity that corresponds to the lower bound for that client. Any excess amount of the capacity is then allocated to the clients based at least partly on the lower bound and the upper bound of each of the clients.

32 Claims, 5 Drawing Sheets

RESOURCE ALLOCATION USING CAPACITY DISTRIBUTION

BACKGROUND

Sharing resources in networked computers, such as processors, computer memories, network bandwidth and data storage facilities, can increase efficiency by reducing maintenance and operating costs, allowing flexibility with respect to individual resource usage, and simplifying resource management. With respect to shared storage, the benefits include data consolidation, universal access to data, ease of storage management, and support for live migration of virtual machines (VMs) for virtualized environments.

However, sharing of resources present challenges with respect to allocation of the resources to the consuming entities, such as VMs. As an example, the current demands of the consuming entities with respect to the resources may need to be considered in allocating the resources. As another example, the consuming entities may vary in terms of their importance, and thus, more important consuming entities may require more of the resources relative to the other less important consuming entities. In addition to these challenges, a resource allocation scheme may need to be scalable with respect to the number of consuming entities and/or with respect to the infrastructure that supports the consuming entities.

SUMMARY

A system and method for allocating a resource among clients running on host computers using capacity distribution uses lower and upper bounds with respect to a capacity to be distributed to each of the clients. Each client is allocated a portion of the capacity that corresponds to the lower bound for that client. Any excess amount of the capacity is then allocated to the clients based at least partly on the lower bound and the upper bound of each of the clients.

A method for allocating a resource among clients running on host computers using capacity distribution in accordance with an embodiment of the invention comprises setting a lower bound and an upper bound with respect to a capacity to be distributed to each of the clients, the capacity relating to allocation of the resource, allocating a portion of the capacity to each of the clients that corresponds to the lower bound for that client, computing an excess amount of the capacity after the capacity has been allocated to each of the clients based on the lower bound, and allocating the excess amount of the capacity to the clients based at least partly on the lower bound and the upper bound of each of the clients to derive total capacity allocation values for the clients, the total capacity allocation values being used to allocate the resource to the clients. In some embodiments, the steps of this method are performed when program instructions contained in a computer-readable storage medium is executed by one or more processors.

A distributed computer system in accordance with an embodiment of the invention comprises a plurality of clusters of host computers and at least one resource management module operably connected to the clusters of host computers. Each of the host computers includes a processor, memory and a network interface, the host computer being configured to support a plurality of clients. The at least one resource management module is configured to: set a lower bound and an upper bound with respect to a capacity to be distributed to each of the clients, the capacity relating to allocation of a resource to the clients; allocate a portion of the capacity to each of the clients that corresponds to the lower bound for that client; compute an excess amount of the capacity after the capacity has been allocated to each of the clients based on the lower bound; and allocate the excess amount of the capacity to the clients based at least partly on the lower bound and the upper bound of each of the clients to derive total capacity allocation values for the clients. The total capacity allocation values are used to allocate the resource to the clients.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
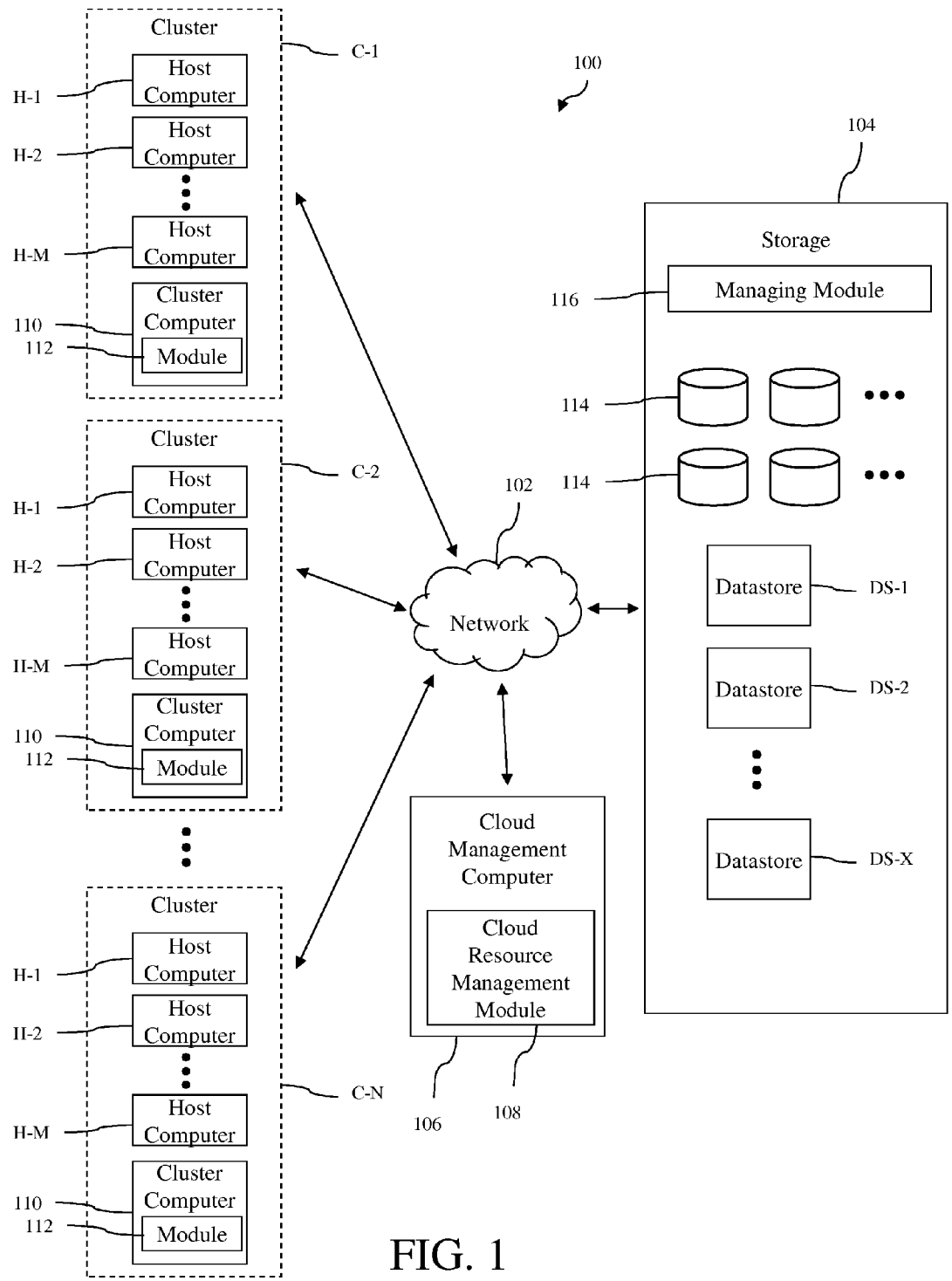
FIG. 1 is a block diagram of a distributed computer system in accordance with an embodiment of the invention.

Turning now to FIG. 1, a distributed computer system 100 in accordance with an embodiment of the invention is shown. As shown in FIG. 1, the distributed computer system includes a network 102, clusters C-1, C-2 . . . C-N (where N is a positive integer) of host computers, storage 104 and a cloud management computer 106 with a cloud resource management module 108. The exact number of host computer clusters included in the distributed computer system can be any number of clusters from few clusters to tens of clusters or more. The host computers of the different clusters, the storage and the management computer are connected to the network. Thus, each of the host computers in the clusters and the management computer are able to access the storage via the network and may share the resources provided by the storage. Consequently, any process running on any of the host computers and the management computer may also access the storage via the network.

In the illustrated embodiment, each of the clusters C-1, C-2 . . . C-N includes a number of host computers H-1, H-2 . . . H-M (where M is a positive integer) and a cluster management computer 110 with a cluster resource management module 112. The number of host computers included in each of the clusters can be any number from one to several hundred or more. In addition, the number of host computers included in each of the clusters can vary so that different clusters can have different number of host computers. The host computers are physical computer systems that host or support one or more clients so that the clients are executing on the physical computer systems. As used herein, the term "client" is any software entity that can run on a computer system, such as a software application, a software process or a virtual machine (VM). The host computers may be servers that are commonly found in data centers. As an example, the host computers may be servers installed in one or more server racks. Typically, the host computers are located within the same server rack.

Figure 2:
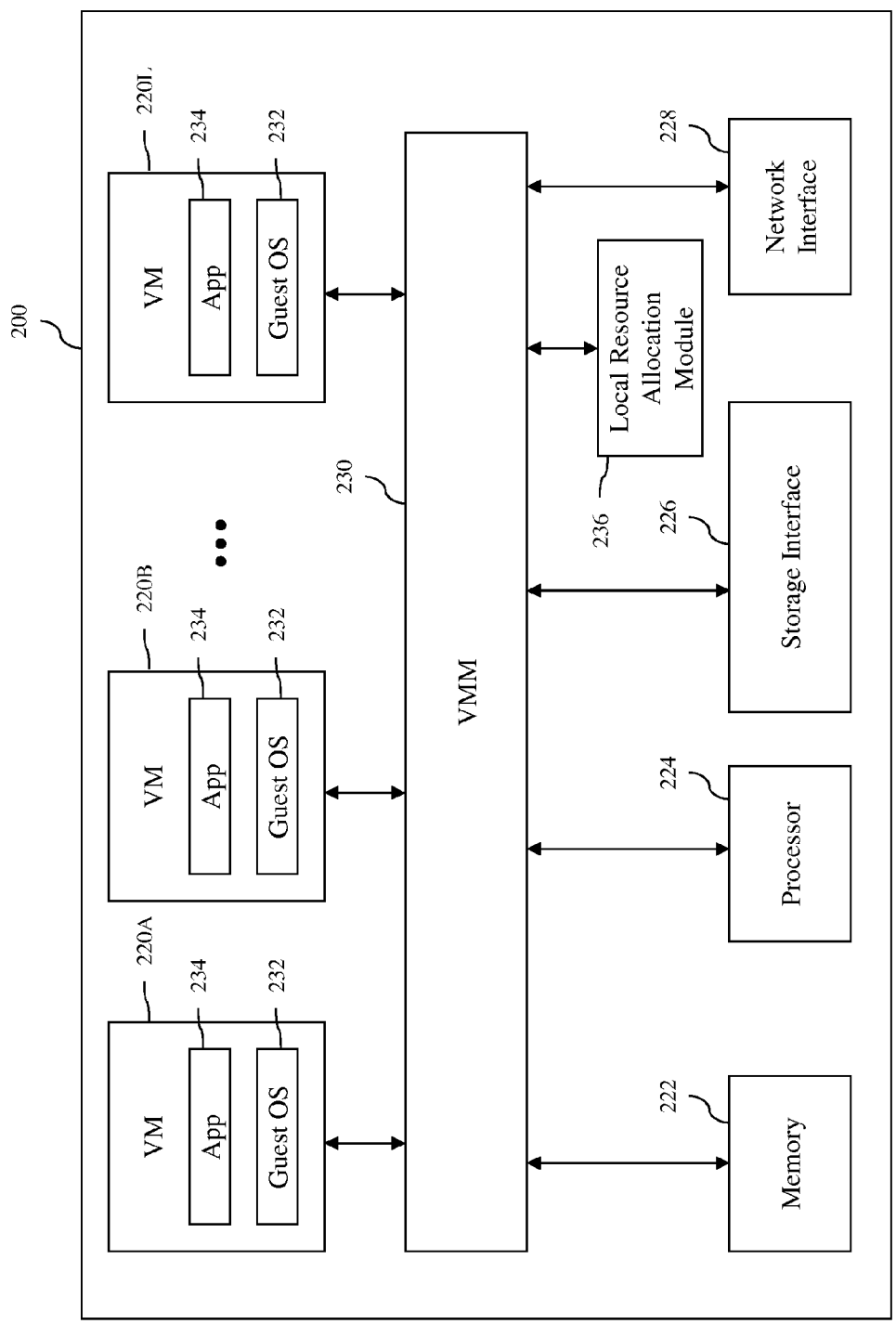
FIG. 2 is a block diagram of a host computer of the distributed computer system of FIG. 1 in accordance with an embodiment of the invention.

Turning now to FIG. 2, components of a host computer 200 that is representative of the host computers H-1, H-2 . . . H-M in the clusters C-1, C-2 . . . C-N in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on top of a virtual machine monitor (VMM) 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system 232 and one or more guest applications 234. The guest operating system is a master control program of the respective VM and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

The host computer 200 also includes a local resource allocation module 236 that operates as part of a resource allocation system to manage and allocate resources consumed by the VMs 220A, 220B . . . 220L using resource allocation parameters, which are described in more detail below. Although the local resource allocation module is illustrated in FIG. 2 as being separate from the virtual machine monitor 230, the local resource allocation module may be implemented as part of the virtual machine monitor. In some embodiments, the local resource allocation module is implemented as software program running on the host computer. However, in other embodiments, the local resource allocation module may be implemented using any combination of software and hardware.

Turning back to FIG. 1, each of the cluster management computers 110 in the clusters C-1, C-2 . . . C-N operates to monitor and manage the host computers H-1, H-2 . . . H-M in the respective cluster. Each cluster management computer may be configured to monitor the current configurations of the host computers and the clients running on the host computers, for example, virtual machines (VMs), in the respective cluster. The monitored configurations may include hardware configuration of each of the host computers, such as CPU type and memory size, and/or software configurations of each of the host computers, such as operating system (OS) type and installed applications or software programs. The monitored configurations may also include client hosting information, i.e., which clients, e.g., VMs, are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource parameter settings, such as demand, limit, reservation and share values for various resources, e.g., CPU, memory, network bandwidth and storage, which are consumed by the clients. In an implementation, for each client, the limit, reservation and share values for one or more consumable resources are user-defined or predefined as default values. The demand values of the clients for the consumable resources are determined by the host computers hosting the clients by monitoring the current usage of resources by the clients, e.g., CPU processing usage, memory usage, network usage and/or storage usage, and provided to the respective cluster management computers.

The cluster management computers 110 may also perform various operations to manage the clients and the host computers H-1, H-2 . . . H-M in their respective clusters. As an example, the cluster management computers may be configured to initially place new clients onto one or more of the host computers in their respective clusters and move existing clients to different host computers and/or different clusters. As another example, the cluster management computers may be configured to power down particular clients and/or host computers in their respective clusters to conserve power. The cluster management computers may be configured or programmed to perform other operations to manage their respective clusters. In some embodiments, the cluster management computers may be physical computers. In other embodiments, each of the cluster management computers may be implemented as software program running on a physical computer or a VM. In an implementation, the cluster management computers are VMware vCenter™ servers with at least some of the features available for such servers.

The cluster resource management module 112 in each of the cluster management computers operates to implement a resource allocation technique, as described in more detail below. In the illustrated embodiment, the cluster resource management modules of the cluster management computers and the cloud resource management module work together to implement the resource allocation technique. In some embodiments, the cluster resource management module is implemented as software program running on the supporting computer. However, in other embodiments, the cluster resource management module may be implemented using any combination of software and hardware.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers H-1, H-2 . . . H-M of the clusters C-1, C-2 . . . C-N, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 114, which can be any type of storage devices, such as solid-state devices (SSDs), hard disks or a combination of the two. The storage devices may operate as components of a network-attached storage (NAS) and/or a storage area network (SAN). The storage includes a storage managing module 116, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters. For virtual machines, the datastores may be used to store virtual storage, e.g., virtual disks, used by each of the virtual machines, as well as other files needed to support the virtual machines. One or more datastores may be associated with one or more host computers. Thus, each host computer is associated with at least one datastore. Some of the datastores may be grouped into one or more clusters of datastores, which are commonly referred to as storage pods.

The cloud management computer 106 operates to monitor and manage the clusters C-1, C-2 . . . C-N to provide a cloud environment using the host computers H-1, H-2 . . . H-M in the clusters. The cloud management computer allows users or customers to create and use cloud-based virtual data centers (VDCs) with specified resource requirements. One VDC may include clients running on different host computers that are part of different clusters. Thus, in a single cluster, a group of clients running on the host computers of that cluster may belong to one VDC, while the other clients running on the host computers of the same cluster may belong to other VDCs. It is also possible that, in a single host computer, one or more clients running on that host computer belong to one VDC, while the other clients running on the same host computer belong to other VDCs. The cloud management computer performs operations to manage the VDCs supported by the distributed computer system. In some embodiments, the cloud management computer may be a physical computer. In other embodiments, the cloud management computer may be implemented as software program running on a physical computer or a VM, which may be part of one of the clusters C-1, C-2 . . . C-N.

The cloud resource management module 108 of the cloud management computer 106 operates to implement the resource allocation technique using capacity distribution for one or more VDCs, as described in more detail below. In some embodiments, the cloud resource management module is implemented as software program running on the supporting physical computer. However, in other embodiments, the cloud resource management module may be implemented using any combination of software and hardware.

The distributed network system 100 allows a customer to define a VDC in terms of total resource requirements for the VDC. The customer requirements for a particular resource are specified in the form of a root reservation value and a root limit value for the VDC. The VDC reservation value represents the total amount of resource that is guaranteed for the customer in aggregate across all the VMs in the VDC. Similarly, the VDC limit value represents that maximum aggregate allocation that can be made to all the VMs in the VDC. Although VDCs and VMs are used herein, the invention described herein are not limited to VDCs and VMs, and can be applied to any type of entities or infrastructures that include a number of clients.

In an embodiment, each VM(i) created by the customer in the VDC is given its own static control settings for the resource (also referred to herein as resource allocation parameters): reservation value r(i), limit value l(i), as well as a share value s(i). The individual reservation and limit values represent, respectively, the guaranteed allocation and maximum allocation that can be made to the VM. The share values represent relative priorities between VMs. In the absence of other constraints, the resource will be divided among VMs in proportion to their shares. The sum of the VM reservation values should not exceed the VDC reservation value, while the sum of the VM limit values may be higher than the VDC limit value.

The cloud and cluster resource management modules 108 and 112 operate to divide up the VDC reservation value and the VDC limit value among the VMs in the VDC dynamically. If the aggregate static reservation value of the VMs is less than the total reserved capacity R, (i.e., $\Sigma_i r(i) < R$), then R is divvied up among the VMs to provide new lower bounds on the allocation that are higher than their static reservation values. Similarly, if the aggregate static limit value of the VMs is greater than the total reserved capacity L (i.e., $\Sigma_i l(i) > L$), then the individual limit settings of some of the VMs need to be reduced from their static settings to conform to the smaller aggregate limit specified by L. In this embodiment, the run-time divvying is done in a demand-aware manner. That is, the VMs whose recent demand for resources is high are favored in the allocation over those with smaller demand.

The general concept used in the divvying technique implemented in the distributed computer system is now described. Consider a set of VM(i), i=1 . . . n, where $\lambda(i)$ and $\mu(i)$ represent lower and upper bounds respectively on the allocation for VM(i). The system has a capacity $C \geq \Sigma_{i=1}^{n} \lambda(i)$, that needs to be allocated to the VMs. The capacity C can be the VDC reservation value or the VDC limit value. Let A(i) denote the allocation made to VM(i). The set of allocations A(i), I=1, . . . n is said to be harmonious if the conditions below hold.

1. $\forall I, A(i) \geq \lambda(i)$.
2. If $\exists k$ such that $A(k) \geq \mu(k)$ then $\forall j, A(j) \geq \mu(j)$.

In a harmonious allocation, all VMs receive at least their lower bounds. In addition, the second condition ensures that no VM receives more than its upper bound as long as there is some VM whose allocation is below its upper bound. That is, for a given capacity either all VMs cross their upper bounds or none do.

A capacity distribution algorithm in accordance with an embodiment of the invention that can be used to distribute the capacity C using the lower bound $\lambda(i)$ and the upper bound $\mu(i)$ is now described. This capacity distribution algorithm first gives or allocates each VM its lower bound $\lambda(i)$. The algorithm then allocates the remaining capacity ($\rho$) to the VMs in proportions to their unmet needs ($\delta(i)$). The unmet need of a VM is the additional allocation necessary for that VM to reach its upper bound.

A pseudo-code for this distribution algorithm is presented below.

basicBPX Algorithm

| Input |
| --- |
| VM settings: $\Lambda = [\lambda(1) \ldots \lambda(n)]$, $U = [\mu(1) \ldots \mu(n)]$<br>C: Capacity to allocate $C \geq \Sigma_{i=i}^{n} \lambda(i)$.<br>Result: A(i): Allocation computed for VM(i).<br>Variables: $\rho$, $\delta(i)$, i = 1 ... n.<br>For each I = 1, . . . , n do<br>  /* First allocate each VM its lower bound<br>  /* $\delta(i)$ is the unmet need of VM(i)<br>  $A(i) = \lambda(i)$<br>  $\delta(i) = \mu(i) - \lambda(i)$<br>/* $\rho$ is the remaining capacity<br>$\rho = C - \Sigma_{i=1}^{n} \lambda(i)$<br>for each i = 1 . . . , n do<br>  /* Allocate $\rho$ in ratio of the unmet need */<br>  $A(i) = A(i) + (\delta(i)/\Sigma_{j=1}^{n} \delta(j)) \times \rho$ |

The allocation performed by the above algorithm is harmonious since both conditions are satisfied. The condition 1 for a harmonious allocation is clearly satisfied since each VM(i) is initially given its lower bound $\lambda(i)$, the capacity is at least as large as the sum of the lower bounds, and $\delta(i) \geq 0$ for all i. The condition 2 for a harmonious allocation can be proved by contraction. Assume, to the contrary, that there is a pair of VMs s; t such that $A(s) \geq U(s)$ and $A(t) < U(t)$. The allocation made to VM(s) by the algorithm is:

$$A(S) = \lambda(S) + \delta(s)/\Sigma_{j=1}^{n} \delta(j) \times \rho \geq \mu(s)$$

Rewriting, $\delta(s)/\Sigma_{j=1}^{n} \delta(j) \times \rho \geq \mu(s) - \lambda(s) = \delta(s)$
Hence, $\rho/\Sigma_{j=1}^{n} \delta(j) \geq 1$
Writing a similar inequality for A(t) results in:

$$A(t) = \lambda(t) + \delta(t)/\Sigma_{j=1}^{n} \delta(j) \times < \mu(t)$$

$\rho/\Sigma_{j=1}^{n} \delta(j) < 1$

This proves the contradiction.

In one embodiment, the VDC reservation value and the VDC limit value are distributed among the VMs in the VDC using the static demand, limit and reservation values of the VMs without considering VM importance (share values). In this embodiment, the lower bound $\lambda(i)$ for each VM is set to its static user-set reservation value r(i). In addition, the upper bound $\mu(i)$ is set to the smaller value between (1) its static user-set limit value l(i) or (2) its current demand value d(i) or its static user-set reservation value r(i), whichever is larger (i.e., min {l(i), max(r(i), d(i))}). However, in situations where the capacity C is greater than the sum of demand values of the VMs (i.e., $C \geq \Sigma d(i)$), then the lower bound $\lambda(i)$ for each VM is set to its demand value d(i) and the upper bound $\mu(i)$ for each VM is set to its limit value l(i). Additionally, if the demand value d(i) of a VM is smaller than its reservation value r(i), the demand value is made to be equal at least the reservation value. The current demand value d(i) of a VM represents its measured activity in the latest measurement interval. The amount of capacity C to be distributed (i.e., the VDC reservation value or the VDC limit value) is greater than the aggregate of the lower bound values (i.e., $C \geq \Sigma \lambda(i)$).

Figure 3:
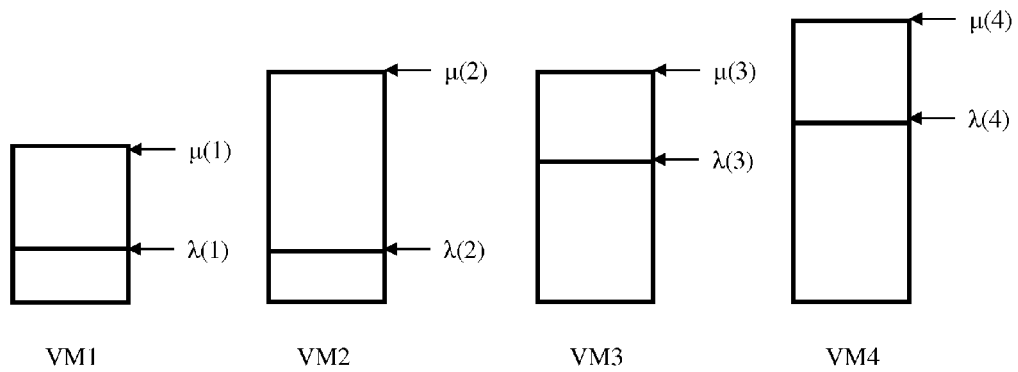
FIG. 3 is a diagram that illustrates lower bound values and upper bound values of four VMs in accordance with an embodiment of the invention.
Figure 4:
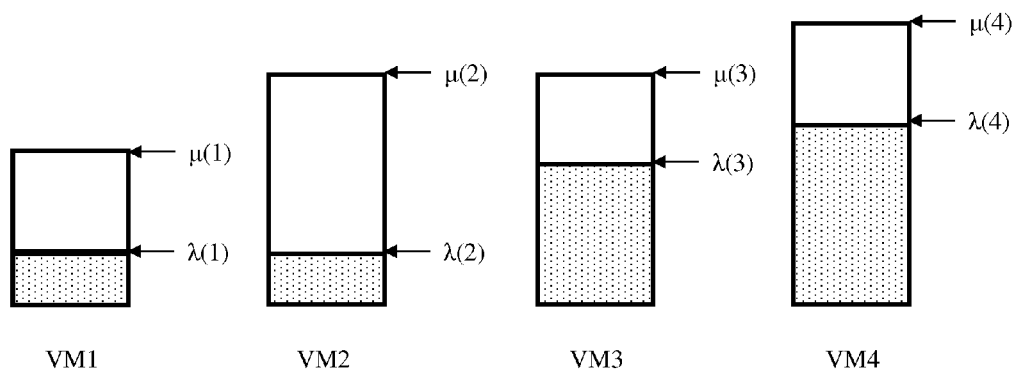
FIG. 4 is a diagram that illustrates that the four VMs are initially allocated portions of a capacity equal to their lower bound values in accordance with an embodiment of the invention.

The distribution of the VDC reservation value and the VDC limit value is executed when a resource allocation process is called, which is periodically invoked at set intervals (e.g., every five minutes). Each of the VMs in the VDC has a lower bound value $\lambda(i)$ and an upper bound value $\mu(i)$, as illustrated in FIG. 3 using VM1, VM2, VM3 and VM4 as examples of VMs in a VDC. The resource allocation process begins when the resource allocation process is invoked. Initially, all the VMs in the VDC are given or allocated portions of the capacity C equal to their lower bound values λ(i), as illustrated in FIG. 4. In order to compute an excess of the capacity C to be distributed, an elasticity value $\delta(i)=\mu(i)-\lambda(i)$ is computed for each VM. The total excess ρ of the capacity C to be distributed is then computed as $\rho=C-\Sigma_i^n \lambda(i)$, where n is the number of VMs in the VDC. The total excess ρ of the capacity C is allocated to the VMs in proportion to their elasticity values δ(i). The final allocation A(i) of the capacity C to the VMs is computed as $$A(i) = \lambda(i) + \rho \times \left( \frac{\delta(i)}{\sum_{j=1}^{n} \delta(j)} \right).$$

Figure 5:
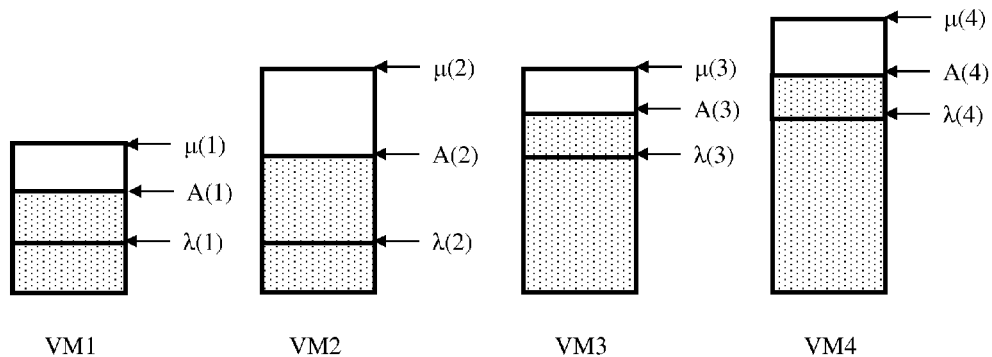
FIG. 5 is a diagram that illustrates situations in which the capacity is equal to or less than the aggregate upper bound value for all the VMs, where no VM gets an amount of the capacity above its upper bound value, in accordance with an embodiment of the invention.
Figure 6:
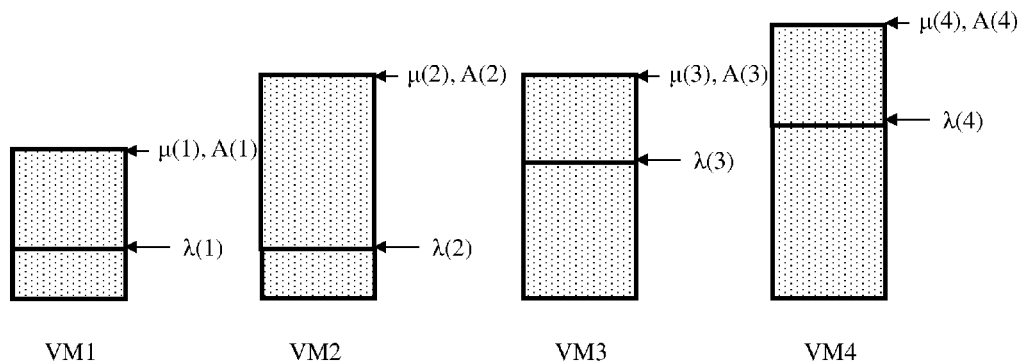
FIG. 6 is a diagram that illustrates situations in which the capacity is greater than the aggregate upper bound value for all the VMs and the upper bound values of VMs have been set to the limit values, where all VMs get an amount of the capacity capped at their upper bound values, in accordance with an embodiment of the invention.

There are two cases for this capacity distribution process based on demand, limit and reservation values of VMs. The first case involves situations in which the capacity C is equal to or less than the aggregate upper bound values for all the VMs, i.e., $C \leq \Sigma_i \mu(i)$. In this case, no VM gets an amount of the capacity above its upper bound value, as illustrated in FIG. 5. The second case involves situations in which the capacity C is greater than the aggregate upper bound value for all the VMs, i.e., $C > \Sigma_i \mu(i)$ and the upper bound values have been set to the limit values. In this case, all VMs get an amount of the capacity equal to their upper bound values, as illustrated in FIG. 6.

An example of the capacity distribution process based on demand, limit and reservation values of VMs is now described using four VMs: VM1, VM2, VM3 and VM4. VM1 has reservation, limit and demand values of (10, 50, 5). The lower bound value for VM1 is 10, which is its reservation value. Since the demand value of VM1 is smaller than its reservation value, the demand value of VM1 is increased to 10, to match its reservation value. The upper bound value for VM1 is 10, which is also its new demand value. VM2 has reservation, limit and demand values of (20, 30, 40). The lower bound value for VM2 is 20, which is its reservation value. The upper bound value for VM2 is 30, which is its limit value. VM3 has reservation, limit and demand values of (30, ∞, 70). The lower bound value for VM3 is 30, which is its reservation value. The upper bound value for VM3 is 70, which is its demand value. VM4 has reservation, limit and demand values of (40, ∞, 140). The lower bound value for VM4 is 40, which is its reservation value. The upper bound value for VM4 is 140, which is its demand value. First, each VM is allocated a portion of the capacity equal to its lower bound. The vector of elasticity (also referred to herein as "unmet demand") values δ(i) for the VMs is [0, 10, 40, 100]. Thus, the aggregate lower bound value for the VMs is $\Sigma_{i=1}^{n} \mu(i)=100$ and the aggregate elasticity value is $\Sigma_{i=1}^{n} \delta(i)=150$. The excess capacity ρ=175−100=75. Dividing the excess capacity in the ratio of unmet demands (i) results in the allocation vector of [0, 5, 20, 50] for the four VMs. Adding these ratios to the lower bound values for each VMs gives the final allocation vector of [10, 25, 50, 90] for the four VMs. In practice, if the capacity is greater than the configured sizes of VMs, each VMs will get allocation equal to its configured size, which is an implicit limit. If the capacity is greater than the demand values, then the demand values can be used as lower bound values and the limit values as upper bound values to do the allocation using the same algorithm.

In an embodiment, the operations for executing the capacity distribution process based on demand, limit and reservation values of VMs are divided between the cluster resource management modules 112 and the cloud resource management module 108. Rather than having the cloud resource management module receive all the necessary information for each VM and process the VM information to determine the capacity allocations for the VMs, the cluster resource management modules provide summary information to the cloud resource management, which sends back the information needed for the cluster resource management modules to compute the capacity allocations for the VMs in their respective clusters.

In this embodiment, each cluster resource management module 112 in a cluster adds up the lower bound values of VMs in that cluster and sends this partial aggregate lower bound value for VMs in a single cluster to the cloud resource management module 108. Each cluster resource management module in a cluster also adds up the elasticity values of VMs in that cluster and sends this partial aggregate elasticity value for VMs in a single cluster to the cloud resource management module. The individual lower bound and elasticity values of a cluster can be determined by the cluster resource management module in that cluster, the host computers in that cluster or the VMs in the cluster. The cloud resource management module then adds all the partial lower bound values from the cluster resource management modules of the different clusters to compute the final aggregate lower bound value for all the VMs in the VDC. The cloud resource management module also adds all the partial elasticity values from the cluster resource management modules of the different clusters to compute the final aggregate elasticity value for all the VMs in the VDC. The final aggregate lower bound value and the final aggregate elasticity value are then transmitted from the cloud resource management module to all the cluster resource management modules. Using the final aggregate lower bound value, each cluster resource management module computes the capacity excess. Each cluster resource management module of a cluster can determine its share of the capacity using the computed capacity excess, the total aggregate elasticity value and the partial aggregate lower bound and elasticity values for that cluster by taking a portion of the capacity excess in proportion to its partial aggregate elasticity value with respect to the total aggregate elasticity value and adding that portion of the capacity excess to the partial aggregate lower bound value. Each cluster resource management module then distributes its share of the capacity to the VMs in its cluster according to the equation $$A(i) = \lambda(i) + \rho \times \left( \frac{\delta(i)}{\sum_{j=1}^{n} \delta(j)} \right).$$

In an alternative implementation, each cluster resource management module multicasts summary information to the other cluster resource management modules participating in the capacity distribution, which allows for purely distributed process for capacity distribution. In this implementation, each cluster resource management module would perform the functions of the cloud resource management module, as described above. Thus, in this implementation, the cloud resource management module is not needed.

In another embodiment, the VDC reservation value and the VDC limit value are distributed among the VMs in the VDC using the demand, limit and reservation values of the VMs, as well the share values of the VMs, which express the relative importance of the VM workloads. The share value for VM(i) is represented by s(i) and the vector of share values by S. The vectors of reservation, limit and demand values are represented by R, L and D, respectively. As before, the capacity to be distributed is represented by C. As used herein, the fair share f(i) of VM(i) is the amount of the capacity represented by its fraction of the total number of shares. That is:

$$f(i) = C \times \frac{s(i)}{\sum_{j=1}^{n} s(j)}$$

In addition, the entitlement e(i) of VM(i) is defined as:

$$e(i) = \begin{cases} \min\{f(i), d(i)\} & \text{if } f(i) \geq r(i); \\ r(i) & \text{otherwise.} \end{cases}$$

The fair share of a VM is simply the amount of allocation the VM would receive if the capacity were divvied out solely on the basis of the share values. The entitlement of a VM that has sufficient demand is its fair share. If a VM does not generate sufficient demand to meet its fair share, then its entitlement is capped at its demand. The entitlement is set to at least the reservation value even if the fair share falls below the reservation value. The vectors of fair shares and entitlements of the VMs collectively are represented as F and E, respectively.

A distribution algorithm with VM share consideration in accordance with an embodiment of the invention is now described. This distribution algorithm follows one of three strategies, depending on the capacity to be distributed relative to the VM resource allocation parameters (e.g., VM demand, reservation, limit and share values). Thus, there are three types of cases that are handled by the distribution algorithms. The first and third cases represent special situations, while the second case represents common situations. In the first case, the aggregate demand value of the VMs in the VDC is less than the available capacity. In the third case, the capacity is less than the aggregate entitlements of the VMs in the VDC. For the first case, the distribution algorithm gives each VM a portion of the capacity equal to its demand value and allocates remaining capacity up to the limit value of the VM. For the third case, the distribution algorithm gives each VM a portion of the capacity equal to its reservation value and allocates remaining capacity up to the entitlement of the VM. For the common second case, the distribution algorithm gives each VM a portion of the capacity equal to its entitlement and allocates remaining capacity up to the demand of the VM.

shareBPX: Divvy with R, L, D, S

---

D' = min{L, max (R, D)}// Modified demand
for each i = 1, . . . , n do
    // Compute Fair Share and Entitlement of each VM $$f(i) = C \times \frac{s(i)}{\sum_{j=1}^{n} s(j)}$$

e(i) = min{d(i), max (f(i), r(i))}

$$\varepsilon = \sum_{i=1}^{n} e(i) \text{// Sum of entitlements}$$

$$D = \sum_{i=1}^{n} d(i) \text{// Sum of demands}$$

$$R = \sum_{i=1}^{n} r(i) \text{// Sum of reservations}$$

if (C ≥ D)
    Call basicBPX(C, D, L)
else if (C ≥ ε)
    Call basicBPX(C, E, D)
else
    Call basicBPX(C, R, E)

---

Properties of the algorithm shareBPX are shown in the following lemmas. Lemma 1 shows that the calls made to basicBPX are consistent in that the lower bounds of the call do not exceed the upper bounds, and the total capacity to be allocated exceeds the sum of the lower bounds. Lemmas 2 and 3 provide necessary conditions that lead to executions of the second and third cases, respectively. Execution of the last case in the algorithm requires that at least one VM has a fair share less than its reservation. Execution of the middle case requires a VM whose fair share is less than its demand. Execution of the first case requires that the total demand is less than the capacity.

Lemma 1 is d(i)≥e(i)≥r(i), ∀i, 1≤i≤n. The proof for lemma 1 is as follows. Since d(i) is one of the arguments to the min operation defining e(i), e(i)≤d(i). Next, it is shown that d(i)≥r(i). If d*(i)≥r(i), then d(i) is set to either d*(i) or to l(i). In the first case, by hypothesis, d(i)=d*(i)≥r(i). In the second case, d(i)=l(i) and by the definition of reservation and limit settings, l(i)≥r(i). On the other hand, if d*(i)<r(i), then d(i) either equals r(i) or equals l(i). In either case, e(i)≥r(i).

Finally, it is shown that e(i)≥r(i). If f(i)≥r(i), then e(i) is set to either f(i) or to d(i). In the first case, by hypothesis, e(i)=f(i)≥r(i). In the second case, e(i)=d(i)≥r(i), by the argument above. On the other hand, if f(i)<r(i), then e(i) either equals r(i) or equals d(i). In either case, e(i)≥r(i).

Lemma 3 is if ∀i, f(i)≥d(i), then C≥D. The proof of lemma 3 is as follows. Let's consider an arbitrary VM, i. By assumption, d(i)≤f(i), and hence $$D = \sum_{i=1}^{n} d(i) \leq \sum_{i=1}^{n} f(i)$$

$$= \sum_{i=1}^{n} C \times \frac{s(i)}{\sum_{j=1}^{n} s(j)}$$

$$= C \times \frac{\sum_{i=1}^{n} s(i)}{\sum_{j=1}^{n} s(j)}$$

$$= C.$$

Lemma 4 is if ∀i, f(i)≥r(i), then C≥E. The proof of lemma 4 is as follows. Let's consider an arbitrary VM, i. By assumption, max(f(i), r(i))=f(i), and so e(i)=min(f(i),d(i)). Therefore, e(i)≤f(i). Hence, $E = \sum_{i=1}^{n} e(i) \leq \sum_{i=1}^{n} f(i) = C$.

An example of the operation of the above algorithm is now described using four VMs (VM1, VM2, VM3, VM4) with the following settings: R=[0; 0; 20; 20], L=[1000; 1000; 1000; 1000], S=[1; 1; 10; 20] and D=[20; 5; 40; 150]. The capacity to be divvied out is C=160. In this example, C is greater than the sum of the reservation values, which is 40. The adjusted demand is D'=[20; 5; 40; 150]. The fair shares of the VMs are given by the vector F=[5; 5; 50; 100]. VM1 and VM4 have demand values exceeding their fair shares, while the fair shares of VM2 and VM3 are no more than their demand values. Hence, VM2 and VM3 have their entitlements capped at their demand values, while the entitlements of VM1 and VM4 equal their fair shares, resulting in the entitlement vector E=[5; 5; 40; 100]. The capacity is less than the sum of demand values (D=215), but greater than the sum of entitlements, $\epsilon$=150. The call to directBPX in this case will first give each VM its entitlement. The additional capacity (10) over c will be distributed to the VMs in the ratio 15:0:0:50. The final allocation vector is [7.3, 5, 40, 107.7]. In contrast, a min-max allocation with floors and ceilings at reservation values and demand values, respectively, would have resulted in an allocation vector of [5; 5; 50; 100].

Another example of the operation of the above algorithm is now described using four VMs (VM1, VM2, VM3, VM4) with the following settings: R=[40; 40; 40; 40], L=[1000; 1000; 1000; 1000], S=[1; 1; 19; 29] and D=[20; 20; 100; 100]. The capacity to be divvied out is C=250. In this example, C is greater than the sum of the reservation values, which is 160. The demand values of both VM1 and VM2 are below their reservation values, and thus, the demand values are adjusted so that D'=[40; 40; 100; 100]. The fair share vector F=[5; 5; 95; 145]. Since the fair shares of VMs 1 and 2 are below their reservation values, their entitlements are bumped up to the reservation values. The fair share of VM 3 is below its demand value, and so its entitlement is set to its fair share. Finally, the fair share of VM 4 exceeds its demand value, so its entitlement is capped at its demand value. The entitlement vector E=[40; 40; 95; 100]. Thus, $\epsilon$=275, which is higher than the capacity C. Hence, the last case of the algorithm holds, and directBPX must be called with R as the lower bounds and E as the upper bounds. The final allocation vector is [40; 40; 83; 87].

In an embodiment, the operations for executing the capacity distribution process based on demand, limit, reservation and share values of VMs are divided between the cluster resource management module 112 and the cloud resource management module 108. Rather than having the cloud resource management module receive all the necessary information for each VM and process the VM information to determine the capacity allocations for the VMs, the cluster resource management modules provide summary information to the cloud resource management, which sends back the information needed for the cluster resource management modules to compute the capacity allocations for the VMs in their respective clusters.

In this embodiment, each cluster resource management module 112 in a cluster adds up the demand values, the entitlements, the fair shares and the reservation values of VMs in that cluster and sends these partial aggregate values for VMs in a single cluster to the cloud resource management module. Each cluster resource management module in a cluster also adds up the elasticity values of VMs in that cluster and sends this partial aggregate elasticity value for VMs in a single cluster to the cloud resource management module 108. For each cluster, the various values needed for these computations can be determined by the cluster resource management module in that cluster, the host computers in that cluster or the VMs in the cluster. The cloud resource management module then adds all the partial aggregate values from the cluster resource management modules of the different clusters to compute the final aggregate values for all the VMs in the VDC. Thus, the cloud resource management module computes the final aggregate demand value, the final aggregate entitlement and the final aggregate fair share for the VDC. These final aggregate values are then transmitted from the cloud resource management module to all the cluster resource management modules. Using the final aggregate lower bound value, each cluster resource management module computes the capacity excess. Each cluster resource management module of a cluster can determine its share of the capacity using the computed capacity excess, the total aggregate elasticity value and the partial aggregate lower bound and elasticity values for that cluster by taking a portion of the capacity excess in proportion to its partial aggregate elasticity value with respect to the total aggregate elasticity value and adding that portion of the capacity excess to the partial aggregate lower bound value. Each cluster resource management module then distributes its share of the capacity to the VMs in its cluster according to the equation $$A(i) = \lambda(i) + \rho \times \left( \frac{\delta(i)}{\sum_{j=1}^{n} \delta(j)} \right).$$

In an alternative implementation, each cluster resource management module 112 multicasts summary information to the other cluster resource management modules participating in the capacity distribution based on demand, limit, reservation and share values of VMs, which allows for purely distributed process for capacity distribution. In this implementation, each cluster resource management module would perform the functions of the cloud resource management module 108, as described above. Thus, in this implementation, the cloud resource management module is not needed.

Figure 7:
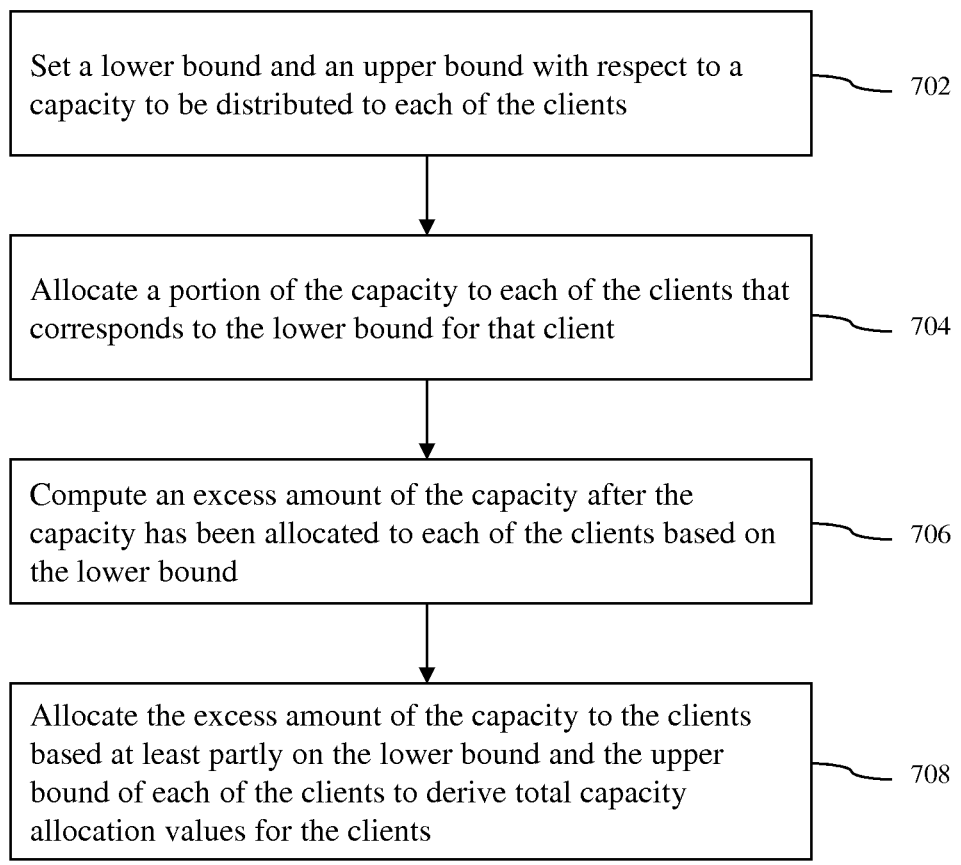
FIG. 7 is a flow diagram of method for allocating a resource among clients running on host computers using capacity distribution in accordance with an embodiment of the invention.

A method for allocating a resource among clients running on host computers using capacity distribution in accordance with an embodiment of the invention is described with reference to a flow diagram of FIG. 7. At block 702, a lower bound and an upper bound with respect to a capacity to be distributed to each of the clients are set. The capacity to be distributed relates to allocation of the resource. At block 704, a portion of the capacity is allocated to each of the clients that corresponds to the lower bound for that client. At block 706, an excess amount of the capacity is computed after the capacity has been allocated to each of the clients based on the lower bound. At block 708, the excess amount of the capacity is allocated to the clients based at least partly on the lower bound and the upper bound of each of the clients to derive total capacity allocation values for the clients. The total capacity allocation values are used to allocate the resource to the clients.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blue-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for allocating a resource among clients running on host computers using capacity distribution, the method comprising:
    determining a demand value, a reservation value and a limit value for each of the clients, comprising
        determining the demand value for a client based on a measured activity of that client in a measurement interval,
        determining the reservation value for the client based on a guaranteed allocation of the resource to be made to that client and
        determining the limit value for the client based on a maximum allocation of the resource that can be made to that client;
    setting a lower bound representing a minimum capacity of the resource to be allocated to each of the clients, the lower bound of each of the clients being determined based on a comparison between the reservation value and the demand value of each respective client;
    setting an upper bound representing a maximum capacity of the resource to be allocated to each of the clients, the upper bound of each of the clients being determined based on the reservation value, the demand value and the limit value of each respective client;
    allocating a portion of the capacity of the resource to each of the clients based on the lower bound for that client;
    computing an excess amount of the capacity of the resource after the capacity of the resource has been allocated to each of the clients based on the lower bound; and
    allocating the excess amount of the capacity to the clients based at least partly on the lower bound and the upper bound of each of the clients to derive total capacity allocation values for the clients, the total capacity allocation values being used to allocate the resource to the clients.

2. The method of claim 1, wherein the setting the lower bound and the upper bound includes setting the lower bound of each of the clients equal to one of the reservation value and the demand value of that client.

3. The method of claim 2, wherein the setting the lower bound and the upper bound includes setting the upper bound of each of the clients equal to one of the demand value and the limit value of that client.

4. The method of claim 1, further comprising computing elasticity values of the clients, including taking a difference between the lower bound and the upper bound for each of the clients to derive an elasticity value for that client, wherein the elastic values is used to allocate the excess amount of the capacity to each of the clients.

5. The method of claim 4, wherein the allocating the excess amount of the capacity to each of the clients includes allocating the excess amount of the capacity to each of the clients in proportion to their elasticity values.

6. The method of claim 1, wherein the setting the lower bound and the upper bound includes setting the lower bound of each of the clients equal to one of the demand value, the reservation value and a fair value of that client, the fair value being dependent on a share value of that client.

7. The method of claim 6, wherein the setting the lower bound and the upper bound includes setting the upper bound of each of the clients equal to one of the demand value, the limit value and the fair value of that client.

8. The method of claim 7, further comprising determining that the capacity is equal to or greater than a sum of the demand values of the clients, wherein the setting the lower bound and the upper bound includes setting the lower bound of each of the clients equal to the demand value of that client and setting the upper bound of that client equal to the limit value of that client based on the determining that the capacity is equal to or greater than the sum of the demand values of the clients.

9. The method of claim 7, further comprising determining that the capacity is equal to or greater than a sum of entitlements of the clients, wherein the setting the lower bound and the upper bound includes setting the lower bound of each of the clients equal to an entitlement of that client and setting the upper bound of that client equal to the demand value of that client based on the determining that the capacity is equal to or greater than the sum of the entitlements of the clients, the entitlement a particular client being one of the demand value, the fair value and the reservation value of the particular client.

10. The method of claim 7, further comprising determining that the capacity is less than the sum of the demand values of the clients and that the capacity is less than the sum of entitlements of the clients, wherein the setting the lower bound and the upper bound includes setting the lower bound of each of the clients equal to an entitlement of that client and setting the upper bound of that client equal to the reservation value of that client based on determining that the capacity is less than the sum of the demand values of the clients and that the capacity is less than the sum of the entitlements of the clients, the entitlement a particular client being one of the demand value, the fair value and the reservation value of the particular client.

11. The method of claim 1, further comprising determining that the capacity is greater than the sum of the demand values of the clients, wherein the setting the lower bound and the upper bound includes setting the lower bound of each of the clients equal to the demand value of that client based on the determining that the capacity is greater than the sum of the demand values of the clients.

12. The method of claim 2, further comprising determining the limit value of client i, the reservation value of that client i, the demand value of that client i, a maximum function between the reservation value of that client i and the demand value of that client i, and a minimum function between the limit value of client i and the maximum function between the reservation value of that client i and the demand value of that client i, wherein i represents a positive integer, wherein the setting the lower bound and the upper bound includes setting the upper bound of each of the clients equal to min{l(i), max(r(i), d(i))}), wherein l(i) represents the limit value of that client i, r(i) represents the reservation value of that client i, and d(i) represents the demand value of that client i.

13. A non-transitory computer-readable storage medium containing program instructions for allocating a resource among clients running on host computers using capacity distribution, wherein execution of the program instructions by one or more processors causes the one or more processors to perform steps comprising:
  determining a demand value, a reservation value and a limit value for each of the clients, comprising
    determining the demand value for a client based on a measured activity of that client in a measurement interval,
    determining the reservation value for the client based on a guaranteed allocation of the resource to be made to that client and
    determining the limit value for the client based on a maximum allocation of the resource that can be made to that client;
  setting a lower bound representing a minimum capacity of the resource to be allocated to each of the clients, the lower bound of each of the clients being determined based on a comparison between the reservation value and the demand value of each respective client;
  setting an upper bound representing a maximum capacity of the resource to be allocated to each of the clients, the upper bound of each of the clients being determined based on the reservation value, the demand value and the limit value of each respective client;
  allocating a portion of the capacity of the resource to each of the clients based on the lower bound for that client;
  computing an excess amount of the capacity of the resource after the capacity of the resource has been allocated to each of the clients based on the lower bound; and
  allocating the excess amount of the capacity to the clients based at least partly on the lower bound and the upper bound of each of the clients to derive total capacity allocation values for the clients, the total capacity allocation values being used to allocate the resource to the clients.

14. The non-transitory computer-readable storage medium of claim 13, wherein the setting the lower bound and the upper bound includes setting the lower bound of each of the clients equal to one of the reservation value and the demand value of that client.

15. The non-transitory computer-readable storage medium of claim 14, wherein the setting the lower bound and the upper bound includes setting the upper bound of each of the clients equal to one of the demand value and the limit value of that client.

16. The non-transitory computer-readable storage medium of claim 13, wherein the steps further comprise computing elasticity values of the clients, including taking a difference between the lower bound and the upper bound for each of the clients to derive an elasticity value for that client, wherein the elastic values is used to allocate the excess amount of the capacity to each of the clients.

17. The non-transitory computer-readable storage medium of claim 16, wherein the allocating the excess amount of the capacity to each of the clients includes allocating the excess amount of the capacity to each of the clients in proportion to their elasticity values.

18. The non-transitory computer-readable storage medium of claim 13, wherein the setting the lower bound and the upper bound includes setting the lower bound of each of the clients equal to one of the demand value, the reservation value and a fair value of that client, the fair value being dependent on a share value of that client.

19. The non-transitory computer-readable storage medium of claim 18, wherein the setting the lower bound and the upper bound includes setting the upper bound of each of the clients equal to one of the demand value, the limit value and the fair value of that client.

20. The non-transitory computer-readable storage medium of claim 19, wherein the steps further comprise determining that the capacity is equal to or greater than a sum of the demand values of the clients, wherein the setting the lower bound and the upper bound includes setting the lower bound of each of the clients equal to the demand value of that client and setting the upper bound of that client equal to the limit value of that client based on the determining that the capacity is equal to or greater than the sum of the demand values of the clients.

21. The non-transitory computer-readable storage medium of claim 19, wherein the steps further comprise determining that the capacity is equal to or greater than a sum of entitlements of the clients, wherein the setting the lower bound and the upper bound includes setting the lower bound of each of the clients equal to an entitlement of that client and setting the upper bound of that client equal to the demand value of that client based on the determining that the capacity is equal to or greater than the sum of the entitlements of the clients, the entitlement a particular client being one of the demand value, the fair value and the reservation value of the particular client.

22. The non-transitory computer-readable storage medium of claim 19, wherein the steps further comprise determining that the capacity is less than the sum of the demand values of the clients and that the capacity is less than the sum of entitlements of the clients, wherein the setting the lower bound and the upper bound includes setting the lower bound of each of the clients equal to an entitlement of that client and setting the upper bound of that client equal to the reservation value of that client based on determining that the capacity is less than the sum of the demand values of the clients and that the capacity is less than the sum of the entitlements of the clients, the entitlement a particular client being one of the demand value, the fair value and the reservation value of the particular client.

23. A distributed computer system comprising:
  a plurality of clusters of host computers, each of the host computers including a processor, memory and a network interface, the host computer being configured to support a plurality of clients; and
  at least one resource management module operably connected to the clusters of host computers, the at least one resource management module being configured to:
    determine a demand value, a reservation value and a limit value for each of the clients by determining the demand value for a client based on a measured activity of that client in a measurement interval, determining the reservation value for the client based on a guaranteed allocation of the resource to be made to that client and determining the limit value for the client based on a maximum allocation of the resource that can be made to that client;

set a lower bound representing a minimum capacity of the resource to be allocated to each of the clients, the lower bound of each of the clients being determined based on a comparison between the reservation value and the demand value of each respective client;

set an upper bound representing a maximum capacity of the resource to be allocated to each of the clients, the upper bound of each of the clients being determined based on the reservation value, the demand value and the limit value of each respective client;

allocate a portion of the capacity of the resource to each of the clients based on the lower bound for that client;

compute an excess amount of the capacity of the resource after the capacity of the resource has been allocated to each of the clients based on the lower bound; and allocate the excess amount of the capacity to the clients based at least partly on the lower bound and the upper bound of each of the clients to derive total capacity allocation values for the clients, the total capacity allocation values being used to allocate the resource to the clients.

24. The distributed computer system of claim 23, wherein the at least one cluster resource management module is configured to set the lower bound of each of the clients equal to one of the reservation value and the demand value of that client.

25. The distributed computer system of claim 24, wherein the at least one cluster resource management module is configured to set the upper bound of each of the clients equal to one of the demand value and the limit value of that client.

26. The distributed computer system of claim 23, wherein the at least one cluster resource management module is configured to compute elasticity values of the clients by taking a difference between the lower bound and the upper bound for each of the clients to derive an elasticity value for that client, the elastic values being used to allocate the excess amount of the capacity to each of the clients.

27. The distributed computer system of claim 26, wherein the at least one cluster resource management module is configured to allocate the excess amount of the capacity to each of the clients in proportion to their elasticity values.

28. The distributed computer system of claim 23, wherein the at least one cluster resource management module is configured to set the lower bound of each of the clients equal to one of the demand value, the reservation value and a fair value of that client, the fair value being dependent on a share value of that client.

29. The distributed computer system of claim 28, wherein the at least one cluster resource management module is configured to set the upper bound of each of the clients equal to one of the demand value, the limit value and the fair value of that client.

30. The distributed computer system of claim 29, wherein the at least one cluster resource management module is configured to set the lower bound of each of the clients equal to the demand value of that client and is configured to set the upper bound of that client equal to the limit value of that client based on that—the capacity is equal to or greater than a sum of the demand values of the clients.

31. The distributed computer system of claim 29, wherein the at least one cluster resource management module is configured to set the lower bound of each of the clients equal to an entitlement of that client and is configured to set the upper bound of that client equal to the demand value of that client based on that the capacity is equal to or greater than a sum of entitlements of the clients, the entitlement a particular client being one of the demand value, the fair value and the reservation value of the particular client.

32. The distributed computer system of claim 29, wherein the at least one cluster resource management module is configured to set the lower bound of each of the clients equal to an entitlement of that client and is configured to set the upper bound of that client equal to the reservation value of that client based on that the capacity is less than the sum of the demand values of the clients and based on that the capacity is less than the sum of entitlements of the clients, the entitlement a particular client being one of the demand value, the fair value and the reservation value of the particular client.

\* \* \* \* \*